US011885369B2

(12) United States Patent
Shiobara

(10) Patent No.: US 11,885,369 B2
(45) Date of Patent: Jan. 30, 2024

(54) COUPLING MECHANISM

(71) Applicant: SEIKO EPSON CORPORATION, Tokyo (JP)

(72) Inventor: Hiroshi Shiobara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 714 days.

(21) Appl. No.: 17/001,216

(22) Filed: Aug. 24, 2020

(65) Prior Publication Data
US 2021/0062837 A1    Mar. 4, 2021

(30) Foreign Application Priority Data

Aug. 27, 2019  (JP) ................. 2019-154434

(51) Int. Cl.
F16B 5/06    (2006.01)

(52) U.S. Cl.
CPC .......... F16B 5/0621 (2013.01); F16B 5/0628 (2013.01)

(58) Field of Classification Search
CPC .............. F16B 5/0621; F16B 5/0628
See application file for complete search history.

(56) References Cited

U.S. PATENT DOCUMENTS

| | | | | |
|---|---|---|---|---|
| 5,666,595 A * | 9/1997 | Sameshima | ........ | G03G 15/6502 271/145 |
| 5,940,116 A * | 8/1999 | Park | .......... | G03G 21/1652 347/152 |
| 7,287,998 B2 | 10/2007 | Masai | | |
| 8,152,274 B2 * | 4/2012 | Kim | .......... | B41J 29/02 347/49 |
| 8,295,729 B2 * | 10/2012 | Okauchi | .......... | G03G 21/1633 399/107 |
| 8,564,633 B2 * | 10/2013 | Matsushima | .......... | B41J 2/32 347/197 |
| 9,188,948 B2 * | 11/2015 | Okauchi | .......... | G03G 15/6502 |
| 9,207,620 B2 | 12/2015 | Okumura et al. | | |
| 9,933,741 B2 * | 4/2018 | Iwasawa | .......... | G03G 21/1628 |
| 2002/0117595 A1 * | 8/2002 | Bierjon | .......... | B60Q 1/045 248/223.21 |
| 2004/0109713 A1 * | 6/2004 | Ozawa | .......... | G03G 15/6502 399/388 |

(Continued)

FOREIGN PATENT DOCUMENTS

DE    102012024299 A1 *    8/2013 ............. B60R 13/02
JP    2006-313252    11/2006

(Continued)

Primary Examiner — Matthew R Mcmahon
(74) Attorney, Agent, or Firm — WORKMAN NYDEGGER

(57) ABSTRACT

Provided is a coupling mechanism that couples a first apparatus and a second apparatus, in which, on a side of the first apparatus, a projection, a first connector that is arranged at a first distance from the projection, and a guiding member that is arranged at a position closer to the first connector than to the projection and that has two protrusions are arranged, on a side of the second apparatus, a hole portion that receives the projection, a second connector that is arranged at the first distance from the hole portion and connected to the first connector, and a guided member that is guided between the two protrusions of the guiding member are arranged, and the second connector is configured to move together with the guided member.

20 Claims, 7 Drawing Sheets

(56) References Cited

U.S. PATENT DOCUMENTS

| | | |
|---|---|---|
| 2006/0248733 A1 | 11/2006 | Masai |
| 2014/0270837 A1 | 9/2014 | Okumura et al. |
| 2015/0076316 A1 | 3/2015 | Egawa et al. |
| 2017/0285559 A1 | 10/2017 | Masuta et al. |

FOREIGN PATENT DOCUMENTS

| | | | |
|---|---|---|---|
| JP | 2009203034 A | * | 9/2009 |
| JP | H11249357 A | * | 9/2009 |
| JP | 2014-206717 | | 10/2014 |
| JP | 2015-060016 | | 3/2015 |
| JP | 2017-178538 | | 10/2017 |
| JP | 2018-205508 | | 12/2018 |

* cited by examiner

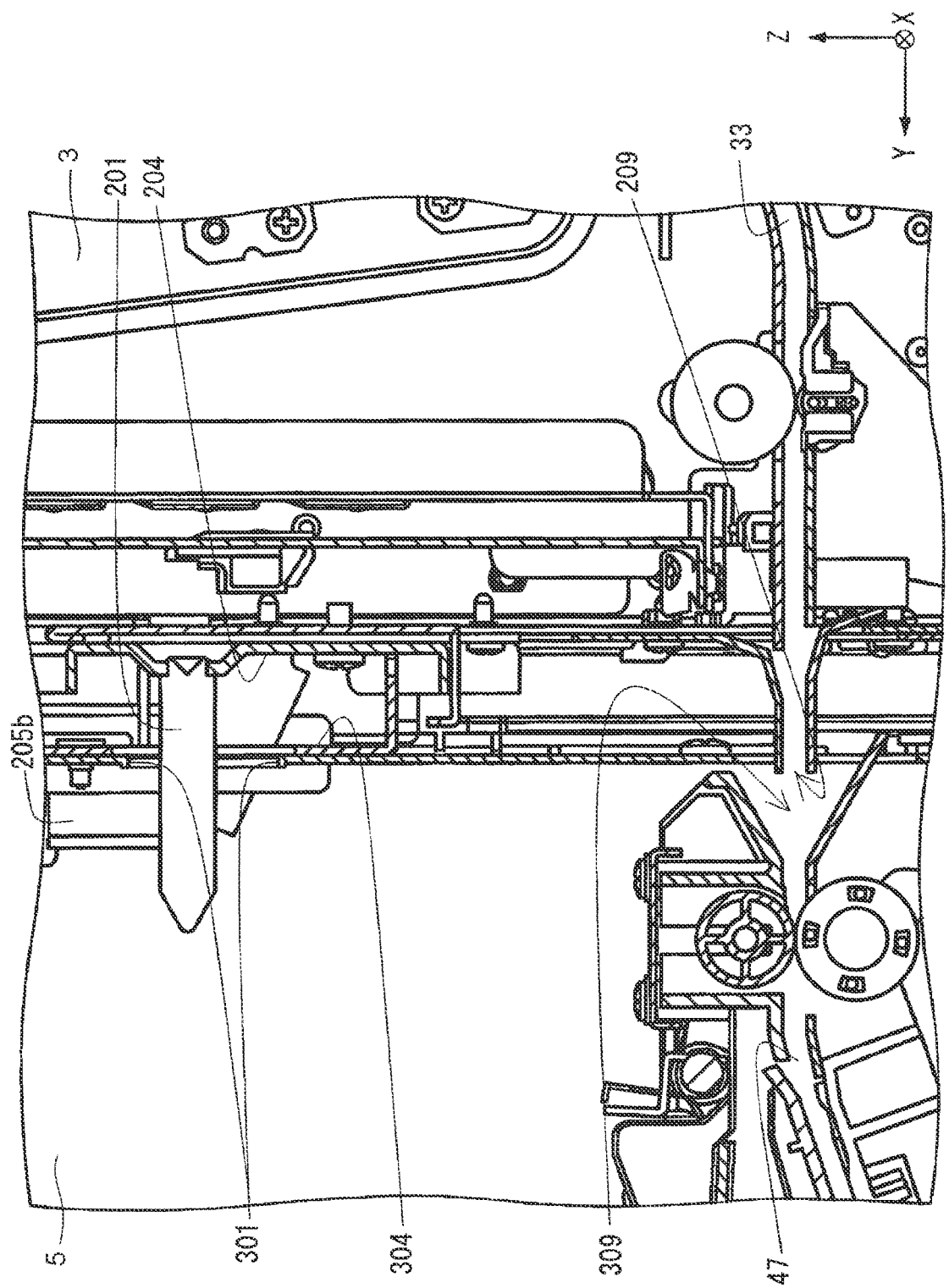

COUPLING MECHANISM

The present application is based on, and claims priority from JP Application Serial Number 2019-154434, filed Aug. 27, 2019, the disclosure of which is hereby incorporated by reference herein in its entirety.

BACKGROUND

1. Technical Field

The present disclosure relates to a coupling mechanism.

2. Related Art

A plurality of apparatuses have been used in a coupled manner in the related art. In accordance with use of a plurality of apparatuses in a coupled manner, a first apparatus and a second apparatus which are to be coupled are aligned. As a configuration by which a first apparatus and a second apparatus are aligned, for example, JP-A-2017-178538 discloses that an image forming apparatus and an optional device are aligned with use of a caster capable of adjusting height in up-and-down direction.

However, aligning the first apparatus and the second apparatus with use of the caster is a heavy burden on a user. This is because it is necessary to repeat fine adjustment by trial and error. As above, in the related art, when the first apparatus and the second apparatus are coupled, the heavy burden lies on the user.

SUMMARY

A coupling mechanism according to an aspect of the present disclosure is a coupling mechanism that couples a first apparatus and a second apparatus, in which, on a side of the first apparatus, a projection that protrudes to a side of the second apparatus, a first connector that is arranged at a first distance from the projection in a second direction intersecting a first direction which is in a protruding direction of the projection, and a guiding member that is arranged at a position closer to the first connector than to the projection in the second direction and that has two protrusions arranged side by side in a third direction intersecting both the first direction and the second direction are arranged, on the side of the second apparatus, a hole portion that receives the projection when the first apparatus and the second apparatus are coupled, a second connector that is arranged at the first distance from the hole portion in the second direction and connected to the first connector when the first apparatus and the second apparatus are coupled, and a guided member that extends in a direction intersecting the third direction and is guided between the two protrusions of the guiding member when the first apparatus and the second apparatus are coupled are arranged, and the second connector is configured to move in the third direction together with the guided member.

BRIEF DESCRIPTION OF THE DRAWINGS

FIG. 7 is a sectional view of the coupling mechanism according to the exemplary embodiment of the disclosure and a vicinity thereof.

DESCRIPTION OF EXEMPLARY EMBODIMENTS

Figure 1:
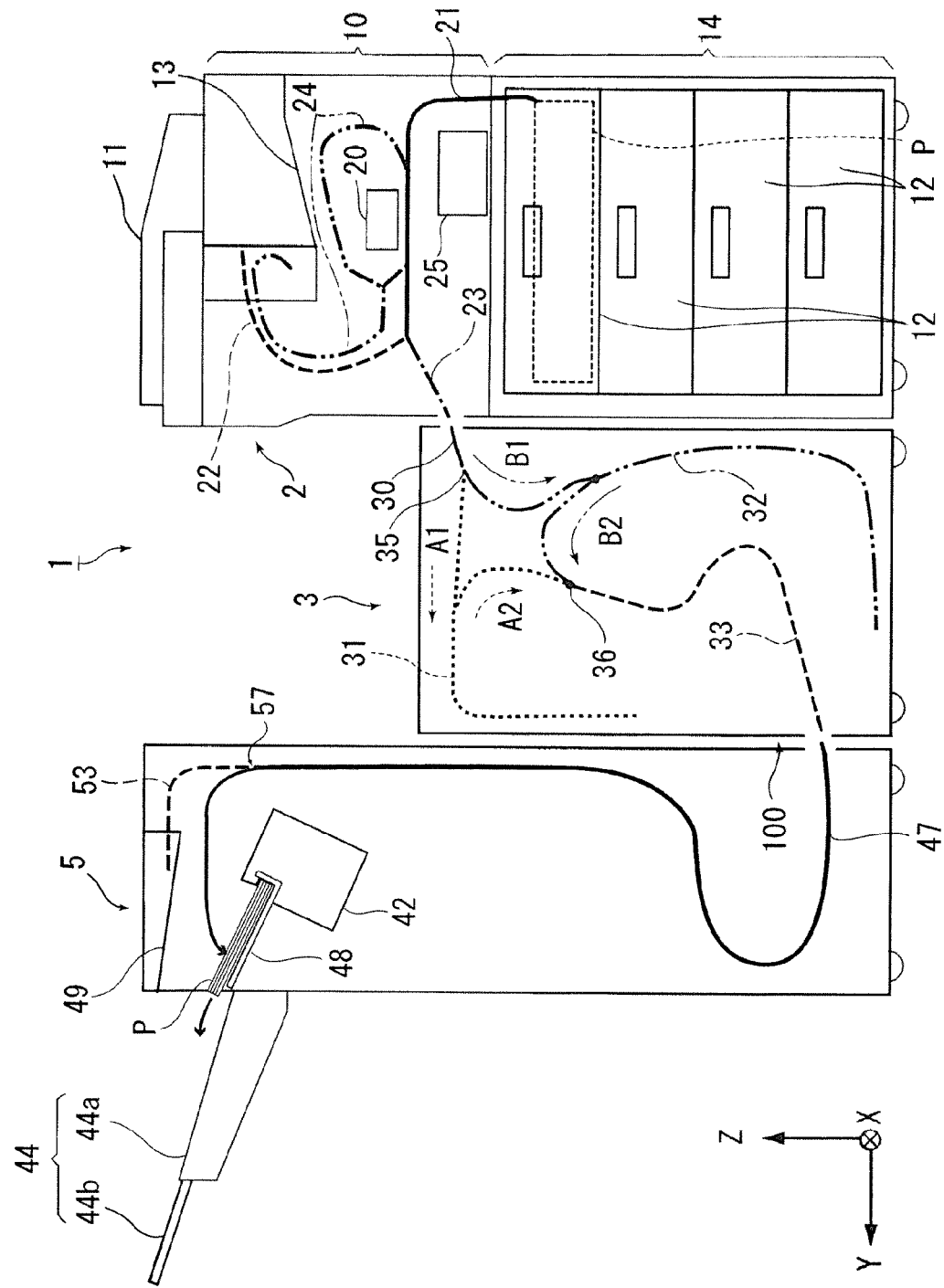
FIG. 1 is a schematic view of a recording system that includes a coupling mechanism according to an exemplary embodiment of the disclosure.

First, the disclosure will be schematically described.

According to a first aspect of the present disclosure, a coupling mechanism couples a first apparatus and a second apparatus, in which, on a side of the first apparatus, a projection that protrudes to a side of the second apparatus, a first connector that is arranged at a first distance from the projection in a second direction intersecting a first direction which is in a protruding direction of the projection, and a guiding member that is arranged at a position closer to the first connector than to the projection in the second direction and that has two protrusions arranged side by side in a third direction intersecting both the first direction and the second direction are arranged, on the side of the second apparatus, a hole portion that receives the projection when the first apparatus and the second apparatus are coupled, a second connector that is arranged at the first distance from the hole portion in the second direction and connected to the first connector when the first apparatus and the second apparatus are coupled, and a guided member that extends in a direction intersecting the third direction and is guided between the two protrusions of the guiding member when the first apparatus and the second apparatus are coupled are arranged, and the second connector is configured to move in the third direction together with the guided member.

According to the present aspect, the projection, the first connector that is arranged at the first distance from the projection, and the guiding member are arranged on the side of the first apparatus, and the hole portion, the second connector that is arranged at the first distance from the hole portion and movable together with the guided member, and the guided member are arranged on the side of the second apparatus. Accordingly, when the projection is inserted into the hole portion, a position of the second connector with respect to the first connector in the second direction is decided. Moreover, when the guided member is guided by the guiding member, the position of the second connector with respect to the first connector in the third direction is also decided. That is, when coupling the first apparatus and the second apparatus, the coupling mechanism of the present aspect does not need to perform fine adjustment of positions of the first apparatus and the second apparatus, and is thus able to reduce a burden.

According to a second aspect of the present disclosure, the coupling mechanism according to the first aspect further includes a fixing member a position of which is configured to be adjusted with respect to the first apparatus and by which the first connector and the guiding member are positioned and fixed.

According to the present aspect, it is possible to adjust the first connector and the guiding member together only by moving the fixing member, thus making it possible to reduce a burden when fine adjustment of the positions of the first apparatus and the second apparatus is performed.

According to a third aspect of the disclosure, the coupling mechanism according to the first or second aspect is configured such that, the hole portion is a long hole that is elongated in the third direction and accepts movement of the projection in the third direction.

According to the present aspect, since the hole portion is the long hole which is elongated in the third direction and accepts the movement of the projection in the third direction, such a simple configuration of the long hole enables a configuration in which the movement of the projection in the third direction and, furthermore, positional deviation between the first apparatus and the second apparatus in the third direction are accepted.

According to a fourth aspect of the disclosure, the coupling mechanism according to any one of the first to third aspects is configured such that the guiding member includes a region in which a gap between the two protrusions in the third direction widens toward a direction in which the protrusions protrude.

According to the present aspect, the guiding member has the region in which the gap between the two protrusions in the third direction widens toward the direction in which the protrusions protrude. Therefore, even when a position of the guided member in the third direction deviates with respect to a position of the guiding member, the guiding member is able to suitably guide the guided member.

According to a fifth aspect of the disclosure, the coupling mechanism according to any one of the first to fourth aspects is configured such that, guiding member guiding portions a gap of which in the second direction widens toward the side of the first apparatus are included on both sides of a region in the second direction, which receives the two protrusions when the first apparatus and the second apparatus are coupled.

According to the present aspect, the guiding member guiding portions, the gap of which in the second direction widens toward the side of the first apparatus, are included on both sides of the region in the second direction, which receives the two protrusions. Therefore, even when the position of the guiding member in the second direction deviates with respect to a position of a receiving port for the guiding member, the guiding member is able to be suitably guided to the receiving port.

According to a sixth aspect of the disclosure, the coupling mechanism according to any one of the first to fifth aspects is configured such that, when a front side of a configuration in which the first apparatus and the second apparatus are coupled is one of directions along the second direction, the projection is arranged closer to the front side than is the guiding member is.

According to the present aspect, the projection is arranged closer to the front side than the guiding member is, so that, when a user performs a coupling operation from the front side, it becomes easy to insert the projection into the hole portion and it is possible to particularly reduce a burden when the first apparatus and the second apparatus are coupled.

According to a seventh aspect of the disclosure, the coupling mechanism according to any one of the first to sixth aspects is configured such that, on the side of the first apparatus, a first arm is provided so as to extend in the second direction, the first arm including an engaging portion, and, on the side of the second apparatus, a second arm is provided so as to extend in the second direction, the second arm including an engaged portion configured to be engaged with the engaging portion when the second arm moves along the second direction with respect to the first arm.

According to the present aspect, by moving the second arm along the second direction with respect to the first arm, locking when the first apparatus and the second apparatus are coupled or cancel of the locking is easily enabled.

According to an eighth aspect of the disclosure, the coupling mechanism according to the seventh aspect is configured such that, the first arm, the projection, and the first connector overlap when viewed from the second direction.

According to the present aspect, the first arm, the projection, and the first connector overlap when viewed from the second direction. Accordingly, it is possible to configure the projection and the first connector integrally with the first arm that is a mechanism for locking when the first apparatus and the second apparatus are coupled and cancel of the locking, thus making it possible to simplify an apparatus configuration.

According to a ninth aspect of the disclosure, the coupling mechanism according to the seventh or eighth aspect is configured such that, the coupling mechanism is used in a configuration in which a medium is transported between the first apparatus and the second apparatus and, compared to a medium discharging port that is provided in one of the first apparatus and the second apparatus and is upstream in a transporting direction of the medium, a medium receiving port that is provided in the other of the first apparatus and the second apparatus and is downstream in the transporting direction is configured to be wider in the third direction.

According to the present aspect, the medium receiving port downstream in the transporting direction is configured to be wider in the third direction compared to the medium discharging port upstream in the transporting direction. Therefore, even when the first apparatus and the second apparatus are coupled in a state where the medium discharging port and the medium receiving port deviate in the third direction, it is possible to transport the medium without a fault while accepting the deviation.

According to a tenth aspect of the disclosure, the coupling mechanism according to the ninth aspect is configured such that, the first arm is arranged at a position closer to, in the third direction, a transporting path of the medium between the first apparatus and the second apparatus than is any end of the first apparatus in the third direction.

According to the present aspect, the first arm is arranged at the position closer to, in the third direction, the transporting path of the medium between the first apparatus and the second apparatus than is any end of the first apparatus in the third direction. That is, the coupling mechanism is arranged at a position close to the transporting path of the medium, so that it is possible to effectively reduce the deviation of the medium discharging port and the medium receiving port.

According to an eleventh aspect of the disclosure, the coupling mechanism according to any one of the first to tenth aspects is configured such that, the first arm is arranged at a position closer to, in the third direction, a center portion of the first apparatus in the third direction than is any end of the first apparatus in the third direction.

According to the present aspect, the first arm is arranged at the position closer to, in the third direction, the center portion of the first apparatus in the third direction than is any end of the first apparatus in the third direction. That is, by arranging the coupling mechanism at a position close to the center portion, it is possible to improve stability for coupling the first apparatus and the second apparatus.

A coupling mechanism 100 according to an exemplary embodiment of the disclosure will be described below in detail with reference to the accompanying drawings. In an X-Y-Z coordinate system illustrated in each of the drawings, an X-axis direction indicates a depth direction of an apparatus, a Y-axis direction indicates a width direction of the apparatus, and a Z-axis direction indicates a height direction of the apparatus. Note that, as an example of an apparatus that includes the coupling mechanism 100 according to the disclosure, a recording system 1 that includes a recording unit 2, an intermediate unit 3, and an end unit 5 is cited below.

Outline of Recording System

The recording system 1 illustrated in FIG. 1 includes, as an example, the recording unit 2, the intermediate unit 3, and the end unit 5 in order from a right side to a left side of FIG. 1. Note that, FIG. 1 is a front view, and a user is able to perform various operations from a front side. The recording unit 2 performs recording on a medium P which is transported. The intermediate unit 3 receives the medium P subjected to the recording from the recording unit 2 and delivers the medium P to the end unit 5. The end unit 5 performs end stitching processing in which received media P are bundled and an end of the bundle is stitched. Hereinafter, description will be specifically given in order of the recording unit 2, the intermediate unit 3, and the end unit 5.

About Recording Unit

The recording unit 2 will be described with reference to FIG. 1. The recording unit 2 is configured as a multifunction peripheral including a printer section 10, which includes a line head 20 as a recording section that performs recording on the medium P, and a scanner section 11. In the present embodiment, the line head 20 is configured as a so-called ink jet recording head that performs recording by ejecting ink, which is liquid, to the medium P.

A cassette accommodating section 14 that includes a plurality of medium accommodating cassettes 12 is provided under the printer section 10. When the medium P accommodated in a medium accommodating cassette 12 is sent to a region, in which recording is performed by the line head 20, through a feeding path 21 which is indicated by a solid line in FIG. 1, a recording operation is performed. The medium P subjected to the recording by the line head 20 is sent either to a first discharging path 22 that is provided above the line head 20 and is a path through which the medium P is discharged to a post-recording discharge tray 13 or to a second discharging path 23 that is a path through which the medium P is sent to the intermediate unit 3.

In FIG. 1, the first discharging path 22 is indicated by a broken line, and the second discharging path 23 is indicated by a one-dot chain line. The second discharging path 23 is provided so as to extend in a +Y direction of the recording unit 2, and delivers the medium P to an adjacent receiving path 30 of the intermediate unit 3.

Moreover, the recording unit 2 includes an inverting path 24 that is indicated by a two-dot chain line in FIG. 1, and is configured to be capable of double-sided recording in which the medium P is inverted after recording on a first surface of the medium P and recording is performed on a second surface. Note that, as an example of a way of transporting the medium P, one or more transport roller pairs illustration of which is omitted are arranged in each of the feeding path 21, the first discharging path 22, the second discharging path 23, and the inverting path 24.

The recording unit 2 is provided with a control section 25 that controls an operation related to transport or recording of the medium P in the recording unit 2. Note that, the recording system 1 is configured so that the recording unit 2, the intermediate unit 3, and the end unit 5 are mechanically and electrically coupled to each other and the medium P is able to be transported from the recording unit 2 to the end unit 5. The control section 25 is able to control various operations in the intermediate unit 3 and the end unit 5 which are coupled to the recording unit 2.

The recording system 1 is configured so that setting in the recording unit 2, the intermediate unit 3, and the end unit 5 is able to be input from an operation panel illustration of which is omitted. The operation panel is able to be provided in the recording unit 2, for example.

About Intermediate Unit

The intermediate unit 3 will be described with reference to FIG. 1. The intermediate unit 3 illustrated in FIG. 1 delivers, to the end unit 5, the medium P received from the recording unit 2. The intermediate unit 3 is arranged between the recording unit 2 and the end unit 5. The medium P transported through the second discharging path 23 of the recording unit 2 is received by the intermediate unit 3 through the receiving path 30 and transported toward the end unit 5. Note that, the receiving path 30 is indicated by a solid line in FIG. 1.

In the intermediate unit 3, there are two transporting paths through which the medium P is transported. A first transporting path is a path through which the medium P is transported from the receiving path 30 to a merging path 33 via a first switchback path 31 that is indicated by a dotted line in FIG. 1. A second path is a path through which the medium P is transported from the receiving path 30 to the merging path 33 via a second switchback path 32 that is indicated by a two-dot chain line in FIG. 1. The first switchback path 31 is a path through which the medium P is switched back in a direction of an arrow A2 after the medium P is received in a direction of an arrow A1. The second switchback path 32 is a path through which the medium P is switched back in a direction of an arrow B2 after the medium P is received in a direction of an arrow B1.

The receiving path 30 branches into the first switchback path 31 and the second switchback path 32 at a branching portion 35. A non-illustrated flap by which a destination of the medium P is switched to either the first switchback path 31 or the second switchback path 32 is provided in the branching portion 35.

Moreover, the first switchback path 31 and the second switchback path 32 merge in a merging portion 36. Therefore, it is possible to deliver the medium P to the end unit 5 via the common merging path 33 whether the medium P is sent from the receiving path 30 to the first switchback path 31 or the second switchback path 32.

The medium P transported through the merging path 33 is delivered to a first transporting path 47 of the end unit 5 from a +Y direction of the intermediate unit 3. Note that, one or more transport roller pairs illustration of which is omitted are arranged in each of the receiving path 30, the first switchback path 31, the second switchback path 32, and the merging path 33.

When recording is successively performed for a plurality of media P in the recording unit 2, the media P entering the intermediate unit 3 are alternately sent to the transporting path that passes through the first switchback path 31 and the transporting path that passes through the second switchback path 32. This makes it possible to enhance throughput of transporting a medium in the intermediate unit 3.

Moreover, in a case of a configuration in which recording is performed by ejecting ink, which is liquid, to the medium P as the line head 20 of the present embodiment, when the medium P is damp at a time of processing in the end unit 5 in the latter stage, a recording surface is rubbed or compatibility of the medium P is deteriorated in some cases. When the medium P after recording is delivered from the recording unit 2 to the end unit 5 via the intermediate unit 3, it is possible to prolong a transport time until the medium P after recording is sent to the end unit 5 and make the medium P drier before reaching the end unit 5.

Note that, by the coupling mechanism 100 of the present exemplary embodiment, the intermediate unit 3 and the end unit 5 are electrically and mechanically coupled. Details of the coupling mechanism 100 will be described later.

About End Unit

The end unit 5 will be described with reference to FIG. 1. The end unit 5 includes the first transporting path 47 which leads to a processing section 42 that performs the end stitching processing. The end stitching processing is processing in which corners on one side of the media P or sides on one side of the media P are stitched, for example.

The end unit 5 includes a first tray 44 that receives the media P which have been subjected to the end stitching processing and are discharged from the end unit 5. The first tray 44 is provided so as to protrude in the +Y direction from the end unit 5. In the present embodiment, the first tray 44 includes a base portion 44a and an extending portion 44b, and the extending portion 44b is configured to be able to be stored in the base portion 44a.

In the present embodiment, the processing section 42 is a stapler that performs the end stitching processing in which a plurality of media P are stacked and have ends stitched. Note that, the processing section 42 is also able to be configured to perform, for example, punching processing in which the medium P is punched at a predetermined position.

The medium P received by the end unit 5 is transported through the first transporting path 47 indicated by a solid line in FIG. 1. The medium P transported through the first transporting path 47 is sent to a processing tray 48 and stacked on the processing tray 48 in such a manner that a rear end in a transporting direction is aligned. When the predetermined number of media P are stacked on the processing tray 48, the end stitching processing is performed for rear ends of the media P by the processing section 42. The media P subjected to the end stitching processing are discharged to the first tray 44 by a non-illustrated discharger.

Moreover, a second transporting path 53 that branches from the first transporting path 47 at a branching portion 57 is coupled to the first transporting path 47. The second transporting path 53 is a path through which the medium P is discharged to an upper tray 49 that is provided in an upper portion of the end unit 5. It is possible to stack the medium P, for which processing is not performed, on the upper tray 49.

As an example of a way of transporting the medium P, one or more transport roller pairs illustration of which is omitted are arranged in each of the first transporting path 47 and the second transporting path 53. Moreover, a non-illustrated flap by which a destination of the medium P is switched is provided in the branching portion 57.

About Coupling Mechanism

Figure 2:
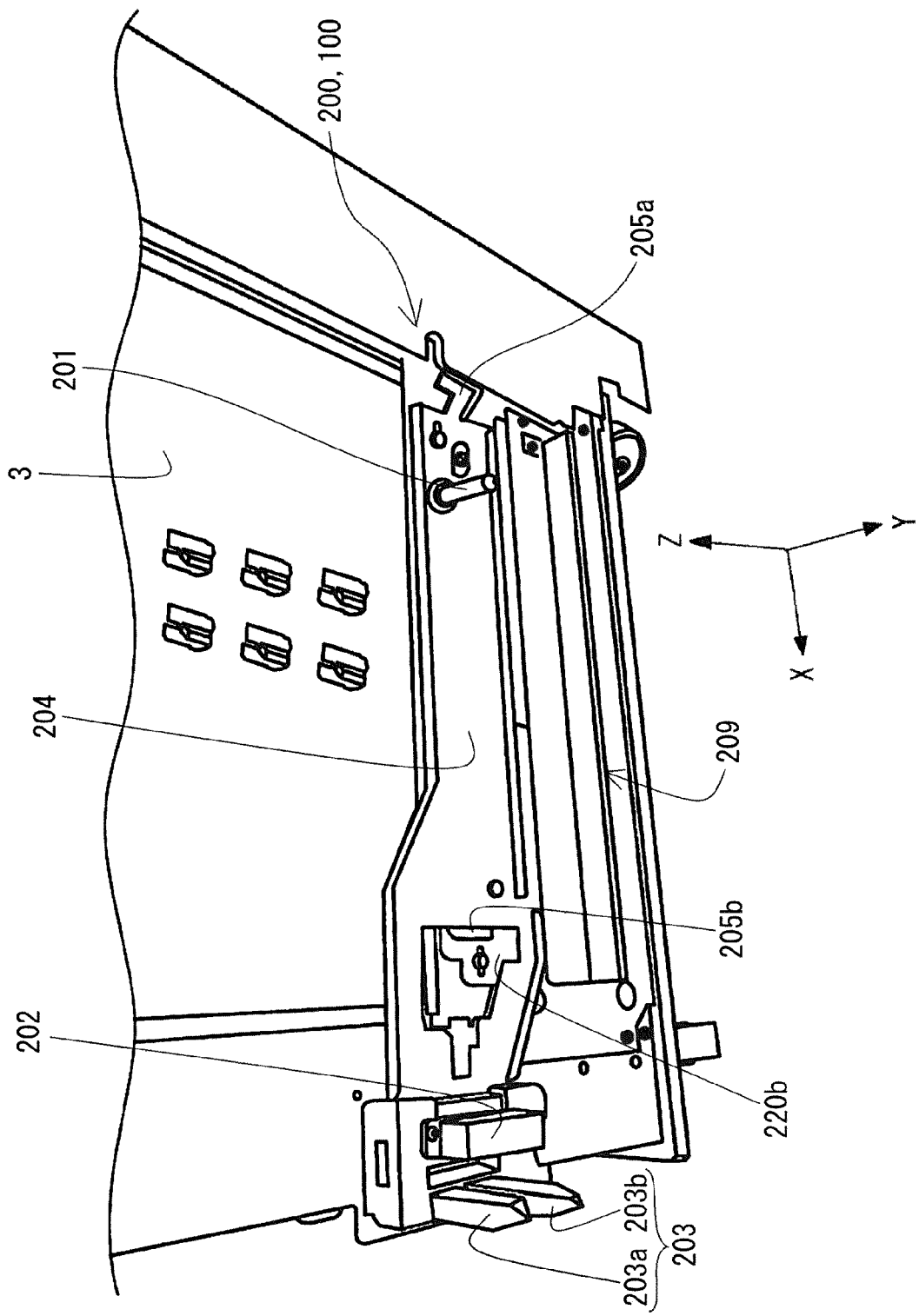
FIG. 2 is a perspective view illustrating a configuration of a side of an intermediate unit of the coupling mechanism according to the exemplary embodiment of the disclosure.
Figure 3:
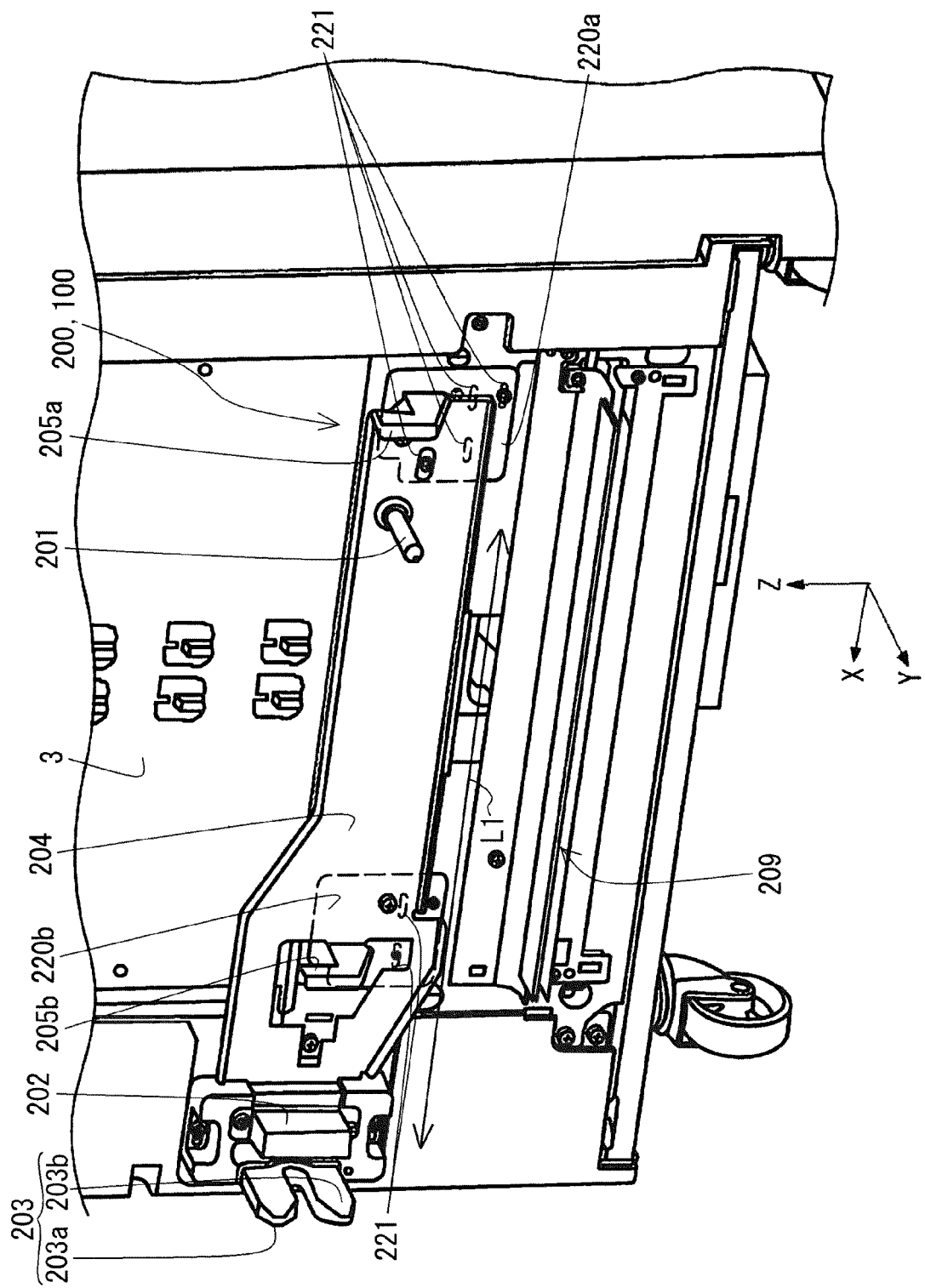
FIG. 3 is a perspective view illustrating the configuration of the side of the intermediate unit of the coupling mechanism according to the exemplary embodiment of the disclosure, which is viewed from an angle different from that of FIG. 2.
Figure 4:
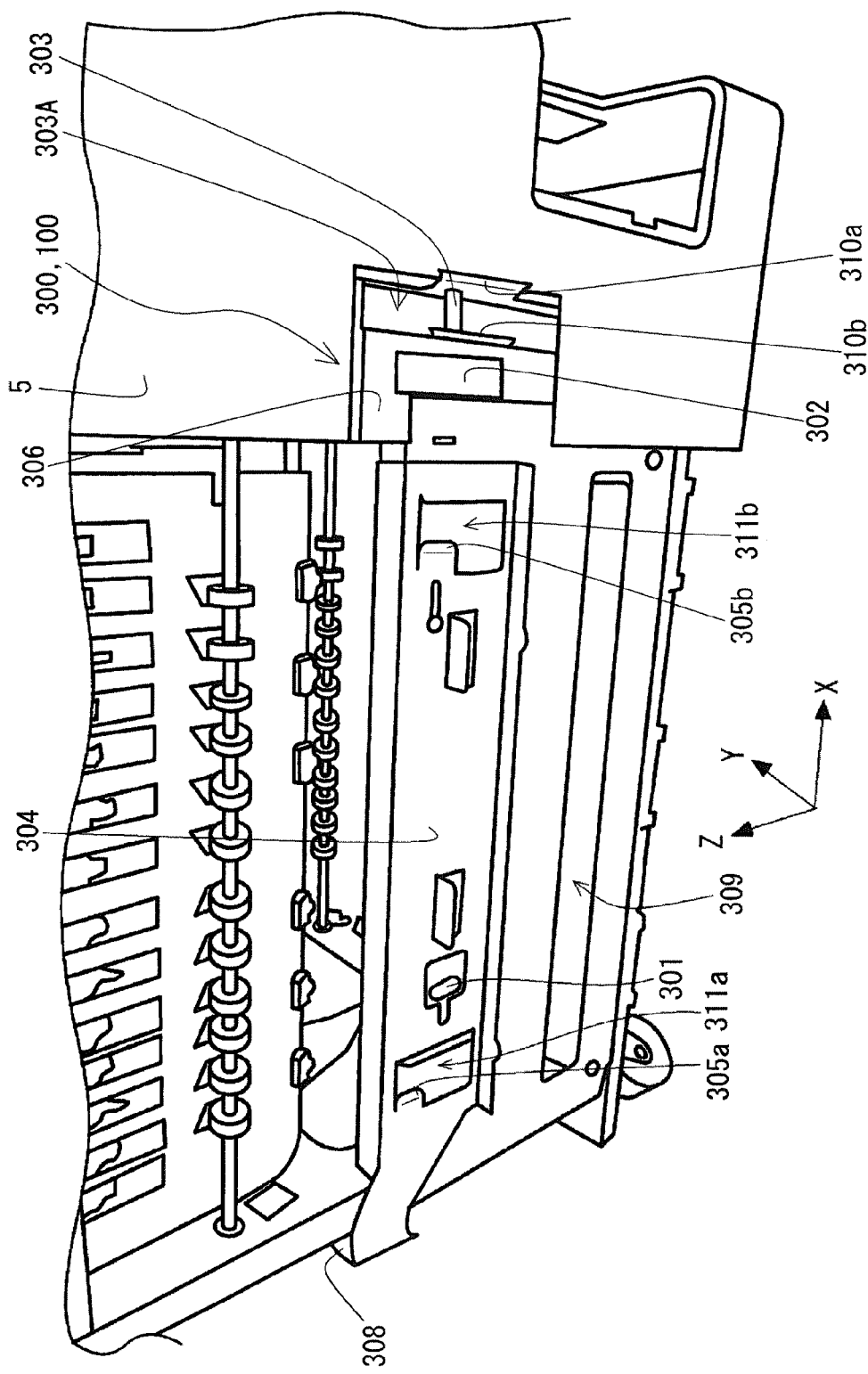
FIG. 4 is a perspective view illustrating a configuration of a side of an end unit of the coupling mechanism according to the exemplary embodiment of the disclosure.
Figure 5:
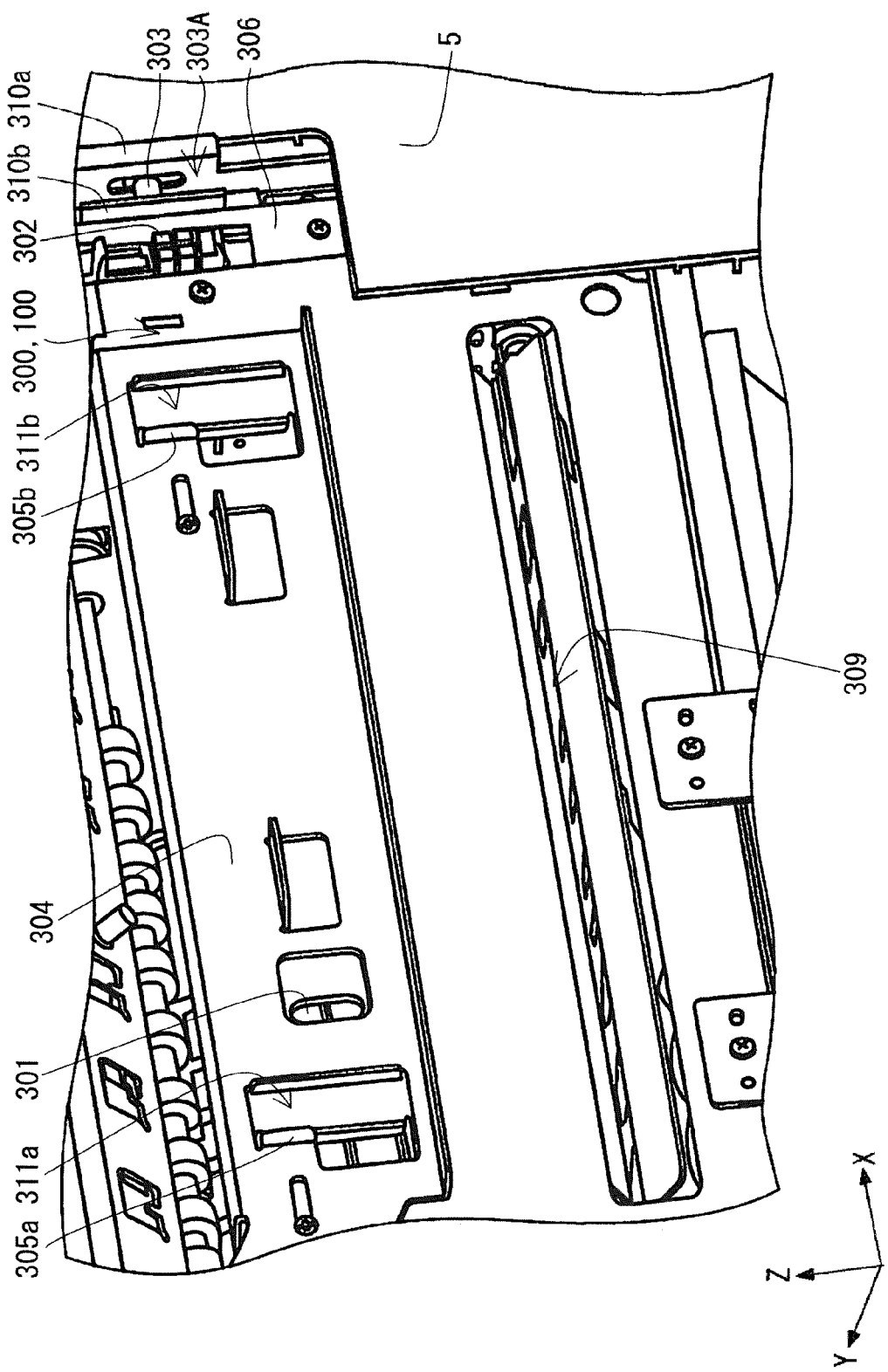
FIG. 5 is a perspective view illustrating the configuration of the side of the end unit of the coupling mechanism according to the exemplary embodiment of the disclosure, which is viewed from an angle different from that of FIG. 4.

Next, the coupling mechanism 100 will be described in detail with reference to FIGS. 2 to 7. As described above, by the coupling mechanism 100 of the present exemplary embodiment, the intermediate unit 3 and the end unit 5 are electrically and mechanically coupled. The coupling mechanism 100 is constituted by a first unit 200 as illustrated in FIGS. 2 and 3, which is on a side of the intermediate unit 3 serving as a first apparatus, and a second unit 300 as illustrated in FIGS. 4 and 5, which is on a side of the end unit 5 serving as a second apparatus. Note that, although the intermediate unit 3 serves as the first apparatus and the end unit 5 serves as the second apparatus in the present exemplary embodiment, the intermediate unit 3 may serve as the second apparatus and the end unit 5 may serve as the first apparatus. In other words, a configuration of the second unit 300 may be provided on the side of the intermediate unit 3 and a configuration of the first unit 200 may be provided on the side of the end unit 5.

As illustrated in FIGS. 2 and 3, the first unit 200 includes a projection 201 that protrudes in the +Y direction which is the side of the end unit 5. Moreover, as illustrated in FIG. 3, the first unit 200 includes a first connector 202 that is arranged at a first distance L1 from the projection 201 in a second direction which is the X-axis direction intersecting a first direction which is the Y-axis direction along a protruding direction of the projection 201. Further, the first unit 200 includes a guiding member 203 that is arranged at a position closer to the first connector 202 than to the projection 201 in the second direction and has two protrusions 203a and 203b arranged side by side in a third direction which is the Z-axis direction intersecting both of the first direction and the second direction.

The projection 201 is provided in a first arm 204 that has engaging portions 205a and 205b each having an L-shape when viewed from the second direction and that is provided so as to extend in the second direction, and the first connector 202 and the guiding member 203 are fixed to the first arm 204. Accordingly, a configuration in which, even when an entirety of the first arm 204 is moved, the first distance L1 does not change is provided. Note that, the first arm 204 is attached to the intermediate unit 3 by screwing via attaching plates 220a and 220b, and a screw hole 221 provided in each of the attaching plates 220a and 220b is a long hole which is elongated in the second direction, so that an attaching position of the first arm 204 with respect to the intermediate unit 3 in the second direction is able to be adjusted.

As illustrated in FIGS. 4 and 5, the second unit 300 includes a hole portion 301 that receives the projection 201 when the intermediate unit 3 and the end unit 5 are coupled. Note that, the hole portion 301 is a long hole which is elongated in the third direction, and a receiving port 303A for the guiding member 203 is also a long hole which is sufficiently long in the third direction, so that a configuration in which a sufficient margin is provided at an attaching position of the first arm 204 with respect to the intermediate unit 3 in the third direction is provided.

Moreover, the second unit 300 includes a second connector 302 that is arranged at a position which is at the first distance L1 from the hole portion 301 in the second direction and that is connected to the first connector 202 when the intermediate unit 3 and the end unit 5 are coupled. Here, the first connector 202 and the second connector 302 are connectors by which the intermediate unit 3 and the end unit 5 are electrically coupled. In addition, the second unit 300 includes a guided member 303 that extends in the X-axis direction which is a direction intersecting the third direction and that is guided between the two protrusions 203a and 203b of the guiding member 203 when the intermediate unit 3 and the end unit 5 are coupled.

Further, the second unit 300 is provided with a second arm 304 that is provided so as to extend in the second direction. The second arm 304 is provided with hole portions 311a and 311b into which the engaging portions 205a and 205b are able to be respectively inserted and engaged portions 305a and 305b at positions which are respectively adjacent to the hole portions 311a and 311b in the second direction. The engaging portions 205a and 205b and the engaged portions 305a and 305b are configured to be able to be respectively engaged.

Here, the first arm 204 and the second arm 304 form a bolt structure. When the intermediate unit 3 and the end unit 5 are coupled, the projection 201 is inserted into the hole portion 301 and the engaging portions 205a and 205b are respectively inserted into the hole portions 311a and 311b so that the first arm 204 and the second arm 304 are brought into a state of facing and being in contact, and the second arm 304 is moved in a +X direction with respect to the first arm 204. Accordingly, the engaging portion 205a and the engaged portion 305a are engaged and the engaging portion 205b and the engaged portion 305b are engaged, so that the first arm 204 and the second arm 304 are locked. On the other hand, when the coupling of the intermediate unit 3 and the end unit 5 is canceled, by moving the second arm 304 in a −X direction with respect to the first arm 204 from a state where the second arm 304 is locked with respect to the first arm 204, the engaging portion 205a and the engaged portion 305a are disengaged and the engaging portion 205b and the engaged portion 305b are disengaged, and the locking is canceled.

The second arm 304 is configured to be movable along the second direction with respect to a frame of the end unit 5. A user is able to move the second arm 304 in the +X direction and the −X direction by holding a knob 308. By moving the second arm 304 in the +X direction in a state where the engaging portions 205a and 205b are respectively inserted into the hole portions 311a and 311b, the user is able to cause the engaged portions 305a and 305b and the engaging portions 205a and 205b to be engaged, and able to lock the intermediate unit 3 and the end unit 5. Further, by moving the second arm 304 in the −X direction from a state where the engaging portions 205a and 205b are respectively engaged with the engaged portions 305a and 305b and causing the hole portions 311a and 311b to reach positions of the engaging portions 205a and 205b, the user is able to cancel the locking of the intermediate unit 3 and the end unit 5.

Figure 6:
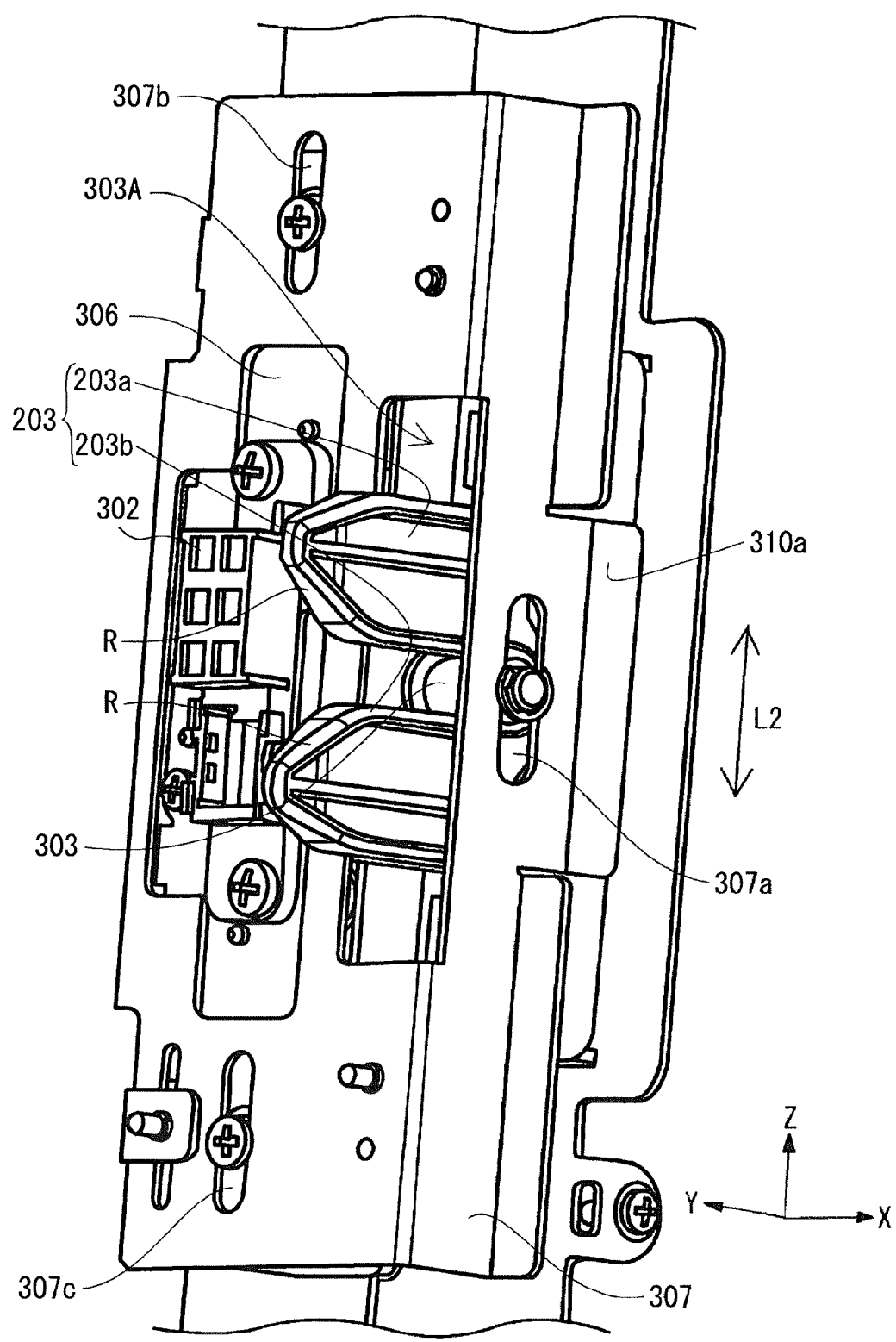
FIG. 6 is a perspective view illustrating a guiding member and a guided member in the coupling mechanism according to the exemplary embodiment of the disclosure.

As illustrated in FIG. 6, the second connector 302 is formed in a moving unit 306 together with the guided member 303, and is configured to be movable in the third direction with respect to a moving unit attaching portion 307 that is fixed to the frame of the end unit 5 and immovable with respect to the end unit 5. Specifically, the moving unit attaching portion 307 includes a hole portion 307a through which the guided member 303 passes and screw holes 307b and 307c through which screws by which the moving unit 306 is attached to the moving unit attaching portion 307 pass. Here, the screws that pass the screw holes 307b and 307c are stepped screws, and the screws are movable in the screw holes 307b and 307c. With such a configuration, the screws do not perform fixation through positioning in the screw holes 307b and 307c, but are always in a state of being free in the Z-axis direction. All of the hole portion 307a and the screw holes 307b and 307c are long holes which are long in the third direction. With such a configuration, the guided member 303 is movable by an amount of a length L2 of the hole portion 307a in the third direction, and the moving unit 306 in which the second connector 302 and the guided member 303 are provided is movable with respect to the moving unit attaching portion 307 in the third direction. Note that, the moving unit 306 is configured so that, by being pulled from both sides in the third direction by non-illustrated springs, the guided member 303 is positioned near a center of the hole portion 307a in the third direction.

As described above, the coupling mechanism 100 of the present exemplary embodiment has the moving unit 306 that is movable with respect to the moving unit attaching portion 307 in the third direction. Therefore, a configuration is provided such that, even in a case where, when the intermediate unit 3 and the end unit 5 are coupled, the guiding member 203 deviates in the third direction and the protrusions 203a and 203b are introduced into the receiving port 303A in a state of deviating in the third direction, the guiding member 203 guides the guided member 303 so as to cause a position of the second connector 302 to be a proper position and the intermediate unit 3 and the end unit 5 are able to be coupled without a fault. That is, since the second connector 302 is configured to be movable in the third direction together with the guided member 303, a configuration in which the intermediate unit 3 and the end unit 5 are able to be coupled without a fault is provided.

In other words, in the coupling mechanism 100 of the present exemplary embodiment, the projection 201, the first connector 202 that is arranged at the first distance L1 from the projection 201, and the guiding member 203 are arranged on the side of the intermediate unit 3. The hole portion 301 that receives the projection 201, the second connector 302 that is arranged at the first distance L1 from the hole portion 301 and movable together with the guided member 303, and the guided member 303 are arranged on the side of the end unit 5. Accordingly, when the projection 201 is inserted into the hole portion 301, a position of the second connector 302 with respect to the first connector 202 in the second direction is decided. Moreover, when the guided member 303 is guided by the guiding member 203, the position of the second connector 302 with respect to the first connector 202 in the third direction is also decided. That is, when coupling the intermediate unit 3 and the end unit 5, the coupling mechanism 100 of the present exemplary embodiment does not need to perform fine adjustment of positions of the intermediate unit 3 and the end unit 5, and thus provides a configuration by which a burden when the intermediate unit 3 and the end unit 5 are coupled is able to be reduced.

As described above, the coupling mechanism 100 of the present exemplary embodiment includes the first arm 204, a position of the first arm 204 is able to be adjusted with respect to the intermediate unit 3, and the first arm 204 functions as a fixing member by which the first connector 202 and the guiding member 203 are positioned and fixed. That is, the coupling mechanism 100 of the present exemplary embodiment is able to adjust the first connector 202 and the guiding member 203 together only by moving the first arm 204, and is thus able to reduce the burden when performing fine adjustment of the positions of the intermediate unit 3 and the end unit 5.

As described above, the hole portion 301 that receives the projection 201 is a long hole which is elongated in the third direction and accepts movement of the projection 201 in the third direction. Thus, with a simple configuration of the long hole, the coupling mechanism 100 of the present exemplary embodiment forms a configuration in which the movement of the projection 201 in the third direction and, furthermore, positional deviation between the intermediate unit 3 and the end unit 5 in the third direction are accepted.

As illustrated in FIG. 6, in the guiding member 203, tip ends of the protrusions 203*a* and 203*b* have a tapered shape, so that a gap between the protrusions 203*a* and 203*b* becomes wider as coming closer to the tip ends. In other words, the guiding member 203 has a region R in which the gap between the two protrusions 203*a* and 203*b* in the third direction widens toward the +Y direction that is a direction in which the protrusions 203*a* and 203*b* protrude. Therefore, in the coupling mechanism 100 of the present exemplary embodiment, even when a position of the guided member 303 in the third direction deviates with respect to a position of the guiding member 203, the guiding member 203 is able to suitably guide the guided member 303.

As illustrated in FIGS. 4 and 5, the second unit 300 includes plate portions 310*a* and 310*b*, a gap between which becomes wider as coming closer to tip ends, on both sides of the receiving port 303A in the second direction. In other words, the coupling mechanism 100 of the present exemplary embodiment has the plate portions 310*a* and 310*b*, the gap of which in the second direction widens toward the side of the intermediate unit 3 and which serve as a guiding member guiding portion, on both sides of a region in the second direction, which receives the two protrusions 203*a* and 203*b* when the intermediate unit 3 and the end unit 5 are coupled. With such a configuration, in the coupling mechanism 100 of the present exemplary embodiment, even when the position of the guiding member 203 in the second direction deviates with respect to the receiving port 303A, the guiding member 203 is able to be suitably guided to the receiving port 303A. Note that, in the coupling mechanism 100 of the present exemplary embodiment, the plate portion 310*a* is provided in the moving unit attaching portion 307 and the plate portion 310*b* is provided in the moving unit 306.

As illustrated in FIGS. 2 and 3, the projection 201 is arranged on a side of the −X direction, which is closer to the front side than is the guiding member 203. Therefore, the coupling mechanism 100 of the present exemplary embodiment has a configuration in which, when the user performs a coupling operation from the front side, it becomes easy to insert the projection 201 into the hole portion 301 and it is possible to particularly reduce the burden when the intermediate unit 3 and the end unit 5 are coupled.

As described above, in the coupling mechanism 100 of the present exemplary embodiment, the first arm 204 that has the engaging portions 205*a* and 205*b* and is provided so as to extend in the second direction is provided on the side of the intermediate unit 3. Moreover, the second arm 304 that is provided so as to extend in the second direction and has the engaged portions 305*a* and 305*b* which are able to be respectively engaged with the engaging portions 205*a* and 205*b* when moving along the second direction with respect to the first arm 204 is provided on the side of the end unit 5. With such a configuration, in the coupling mechanism 100 of the present exemplary embodiment, by moving the second arm 304 along the second direction with respect to the first arm 204, locking when the intermediate unit 3 and the end unit 5 are coupled or cancel of the locking is easily enabled.

In the coupling mechanism 100 of the present exemplary embodiment, the first arm 204, the projection 201, and the first connector 202 overlap when viewed from the second direction. Accordingly, it is possible to configure the projection 201 and the first connector 202 integrally with the first arm 204 that is a mechanism for locking when the intermediate unit 3 and the end unit 5 are coupled and cancel of the locking, thus making it possible to simplify an apparatus configuration. Note that, since the first arm 204, the projection 201, and the first connector 202 overlap when viewed from the second direction, the second arm 304, the hole portion 301, and the second connector 302 also overlap when viewed from the second direction.

The coupling mechanism 100 of the present exemplary embodiment is used in a configuration in which the medium P is transported between the intermediate unit 3 and the end unit 5. As illustrated in FIG. 7, a medium receiving port 309 provided in the end unit 5 that is an apparatus downstream of the intermediate unit 3 and the end unit 5 is configured to be wider in the third direction compared to a medium discharging port 209 provided in the intermediate unit 3 that is an apparatus upstream of the intermediate unit 3 and the end unit 5. With such a configuration, even when the intermediate unit 3 and the end unit 5 are coupled in a state where the medium discharging port 209 and the medium receiving port 309 deviate in the third direction, it is possible to transport the medium P without a fault while accepting the deviation.

Note that, as illustrated in FIG. 7, in the present exemplary embodiment, a tip end of the medium discharging port 209 is arranged so as to be stuck into the medium receiving port 309. In such a configuration, the tip end of the medium discharging port 209 may be extended with a flexible polycarbonate. Even when the intermediate unit 3 and the end unit 5 are coupled in the state where the medium discharging port 209 and the medium receiving port 309 deviate in the third direction, by extending the medium discharging port 209 with a flexible material, it is possible to effectively accept the deviation in particular. However, there is no limitation to such a configuration.

In the coupling mechanism 100 of the present exemplary embodiment, the first arm 204 is arranged at a position closer to, in the third direction, the medium discharging port 209 and the medium receiving port 309 that serve as a transporting path of the medium P between the intermediate unit 3 and the end unit 5 than is any end of the intermediate unit 3 in the third direction. That is, the coupling mechanism 100 of the present exemplary embodiment is arranged at a position close to the transporting path of the medium P, and therefore has a configuration by which the deviation of the medium discharging port 209 and the medium receiving port 309 is able to be effectively reduced.

Note that, the first arm 204 may be arranged at a position closer to, in the third direction, a center portion of the intermediate unit 3 in the third direction than is any end of the intermediate unit 3 in the third direction. That is, the first arm 204 may be arranged at a position close to the center portion of the intermediate unit 3 in the third direction. This is because such a configuration enables improvement of stability for coupling the intermediate unit 3 and the end unit 5.

Note that, the disclosure is not limited to the aforementioned exemplary embodiment, various modifications can be made within the scope of the disclosure, which is described in the scope of claims, and, needless to say, such modifications are also included in the scope of the disclosure.

What is claimed is:

1. A coupling mechanism that couples a first apparatus and a second apparatus, wherein
on a side of the first apparatus,
a projection that protrudes to a side of the second apparatus,
a first connector that is arranged at a first distance from the projection in a second direction intersecting a first direction which is in a protruding direction of the projection, and
a guiding member that is arranged at a position closer to the first connector than to the projection in the second direction and that has two protrusions arranged side by side in a third direction intersecting both the first direction and the second direction are arranged,
on the side of the second apparatus,
a hole portion that receives the projection when the first apparatus and the second apparatus are coupled,
a second connector that is arranged at the first distance from the hole portion in the second direction and connected to the first connector when the first apparatus and the second apparatus are coupled, the second connector being formed in a moving member, and
a guided member that extends in a direction intersecting the third direction and is guided between the two protrusions of the guiding member when the first apparatus and the second apparatus are coupled, the guided member being formed in the moving member, and
the second connector is configured to move in the third direction together with the guided member by the moving member being configured to move in the third direction relative to a moving unit attaching portion fixed to the second apparatus.

2. The coupling mechanism according to claim 1, further comprising
a fixing member, a position of which is configured to be adjusted with respect to the first apparatus and by which the first connector and the guiding member are positioned and fixed.

3. The coupling mechanism according to claim 2, wherein
the hole portion is a hole that is elongated in the third direction and accepts movement of the projection in the third direction,
the guiding member includes a region in which a gap between the two protrusions in the third direction widens toward a direction in which the protrusions protrude, and
guiding member guiding portions, a gap of which in the second direction widens toward the side of the first apparatus, are included on both sides of a region in the second direction, the region receiving the two protrusions when the first apparatus and the second apparatus are coupled.

4. The coupling mechanism according to claim 3, wherein
when a front side of a configuration in which the first apparatus and the second apparatus are coupled is one of directions along the second direction, the projection is arranged closer to the front side than is the guiding member.

5. The coupling mechanism according to claim 4, wherein
on the side of the first apparatus, a first arm is provided so as to extend in the second direction, the first arm including an engaging portion, and, on the side of the second apparatus, a second arm is provided so as to extend in the second direction, the second arm including an engaged portion configured to be engaged with the engaging portion when the second arm moves along the second direction with respect to the first arm.

6. The coupling mechanism according to claim 1, wherein
the hole portion is a hole that is elongated in the third direction and accepts movement of the projection in the third direction.

7. The coupling mechanism according to claim 1, wherein
the guiding member includes a region in which a gap between the two protrusions in the third direction widens toward a direction in which the protrusions protrude.

8. The coupling mechanism according to claim 1, wherein
guiding member guiding portions, a gap of which in the second direction widens toward the side of the first apparatus, are included on both sides of a region in the second direction, the region receiving the two protrusions when the first apparatus and the second apparatus are coupled.

9. The coupling mechanism according to claim 1, wherein
when a front side of a configuration in which the first apparatus and the second apparatus are coupled is one of directions along the second direction, the projection is arranged closer to the front side than is the guiding member.

10. The coupling mechanism according to claim 1, wherein
on the side of the first apparatus, a first arm is provided so as to extend in the second direction, the first arm including an engaging portion, and, on the side of the second apparatus, a second arm is provided so as to extend in the second direction, the second arm including an engaged portion configured to be engaged with the engaging portion when the second arm moves along the second direction with respect to the first arm.

11. The coupling mechanism according to claim 10, wherein
the first arm, the projection, and the first connector overlap when viewed from the second direction.

12. The coupling mechanism according to claim 10, wherein
the coupling mechanism is used in a configuration in which a medium is transported between the first apparatus and the second apparatus and
compared to a medium discharging port that is provided in one of the first apparatus and the second apparatus and is upstream in a transporting direction of the medium, a medium receiving port that is provided in the other of the first apparatus and the second apparatus and is downstream in the transporting direction is configured to have a dimension in the third direction that is larger than a dimension of the medium discharging port in the third direction.

13. The coupling mechanism according to claim 12, wherein
the first arm is arranged at a position closer to, in the third direction, a transporting path of the medium between the first apparatus and the second apparatus than is any end of the first apparatus in the third direction.

14. The coupling mechanism according to claim 10, wherein
the first arm is arranged at a position closer to, in the third direction, a center portion of the first apparatus in the third direction than is any end of the first apparatus in the third direction.

15. The coupling mechanism according to claim 1, wherein
the guiding member includes a region in which a gap between the two protrusions in the third direction widens toward a direction in which the protrusions protrude, and
guiding member guiding portions, a gap of which in the second direction widens toward the side of the first apparatus, are included on both sides of a region in the second direction, the region receiving the two protrusions when the first apparatus and the second apparatus are coupled.

16. The coupling mechanism according to claim 15, wherein
on the side of the first apparatus, a first arm is provided so as to extend in the second direction, the first arm including an engaging portion, and, on the side of the second apparatus, a second arm is provided so as to extend in the second direction, the second arm including an engaged portion configured to be engaged with the engaging portion when the second arm moves along the second direction with respect to the first arm.

17. The coupling mechanism according to claim 1, wherein
the hole portion is a hole that is elongated in the third direction and accepts movement of the projection in the third direction, and
on the side of the first apparatus, a first arm is provided so as to extend in the second direction, the first arm including an engaging portion, and, on the side of the second apparatus, a second arm is provided so as to extend in the second direction, the second arm including an engaged portion configured to be engaged with the engaging portion when the second arm moves along the second direction with respect to the first arm.

18. The coupling mechanism according to claim 17, wherein
the first arm, the projection, and the first connector overlap when viewed from the second direction.

19. The coupling mechanism according to claim 17, wherein
the coupling mechanism is used in a configuration in which a medium is transported between the first apparatus and the second apparatus and
compared to a medium discharging port that is provided in one of the first apparatus and the second apparatus and is upstream in a transporting direction of the medium, a medium receiving port that is provided in the other of the first apparatus and the second apparatus and is downstream in the transporting direction is configured to have a dimension in the third direction that is larger than a dimension of the medium discharging port in the third direction.

20. The coupling mechanism according to claim 19, wherein
the first arm is arranged at a position closer to, in the third direction, a transporting path of the medium between the first apparatus and the second apparatus than is any end of the first apparatus in the third direction.

* * * * *